United States Patent [19]

Kumamoto

[11] Patent Number: 5,083,217
[45] Date of Patent: Jan. 21, 1992

[54] SHADOW-ADDED IMAGE FORMATION DEVICE

[75] Inventor: Hidechika Kumamoto, Sakai, Japan

[73] Assignee: Mita Industrial Co., Ltd., Osaka, Japan

[21] Appl. No.: 540,213

[22] Filed: Jun. 19, 1990

[30] Foreign Application Priority Data

Jun. 28, 1989 [JP] Japan .................... 1-167359
Jun. 28, 1989 [JP] Japan .................... 1-167360

[51] Int. Cl.$^5$ .......................... H04N 1/387
[52] U.S. Cl. ....................... 358/452; 358/448; 382/54
[58] Field of Search ........... 358/452, 448, 443, 22; 340/729, 730; 382/54; 364/522

[56] References Cited

U.S. PATENT DOCUMENTS 4,186,393 1/1980 Leventer ...................... 340/729
4,729,038 3/1988 Miura et al. .................. 358/300

Primary Examiner—Leo H. Boudreau
Assistant Examiner—Andrew W. Johns
Attorney, Agent, or Firm—Sandler, Greenblum & Bernstein

[57] ABSTRACT

A shadow-added image formation device includes a photoelectric converting mechanism for converting every pixel into an electric signal, A/D-converting mechanism for A/D-converting an output of the photoelectric converting mechanism, a signal converting mechanism for converting an output of the A/D-converting mechanism into a binary serial signal representing white and black pixels, and a detecting mechanism for detecting an area to which shadow can be added from the output of the signal converting mechanism. A shadow signal formation mechanism for outputting a signal, a setting mechanism for setting a shadow area, an adding mechanism for comparing the widths of the areas detected by the detecting mechanism and set by the setting mechanism and adding the shadow signal to the binary serial signal corresponding to the smaller one of the areas determined by the comparison, and a reproducing mechanism for reproducing an image to which the shadow signal has been added, are also provided.

5 Claims, 16 Drawing Sheets

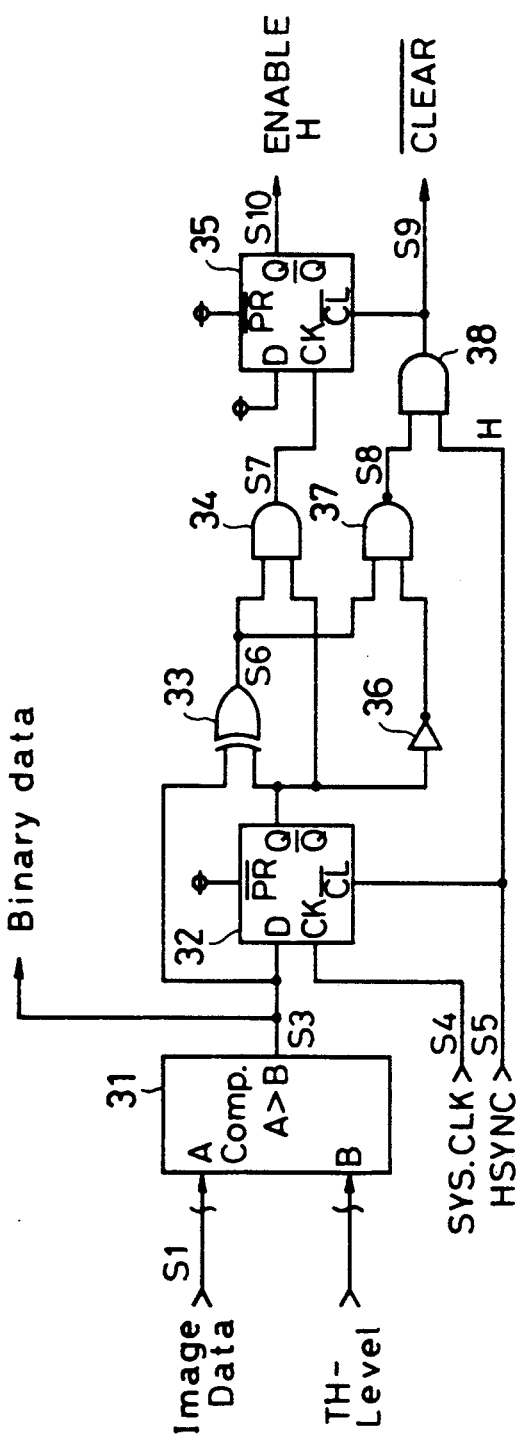
F I G. 4
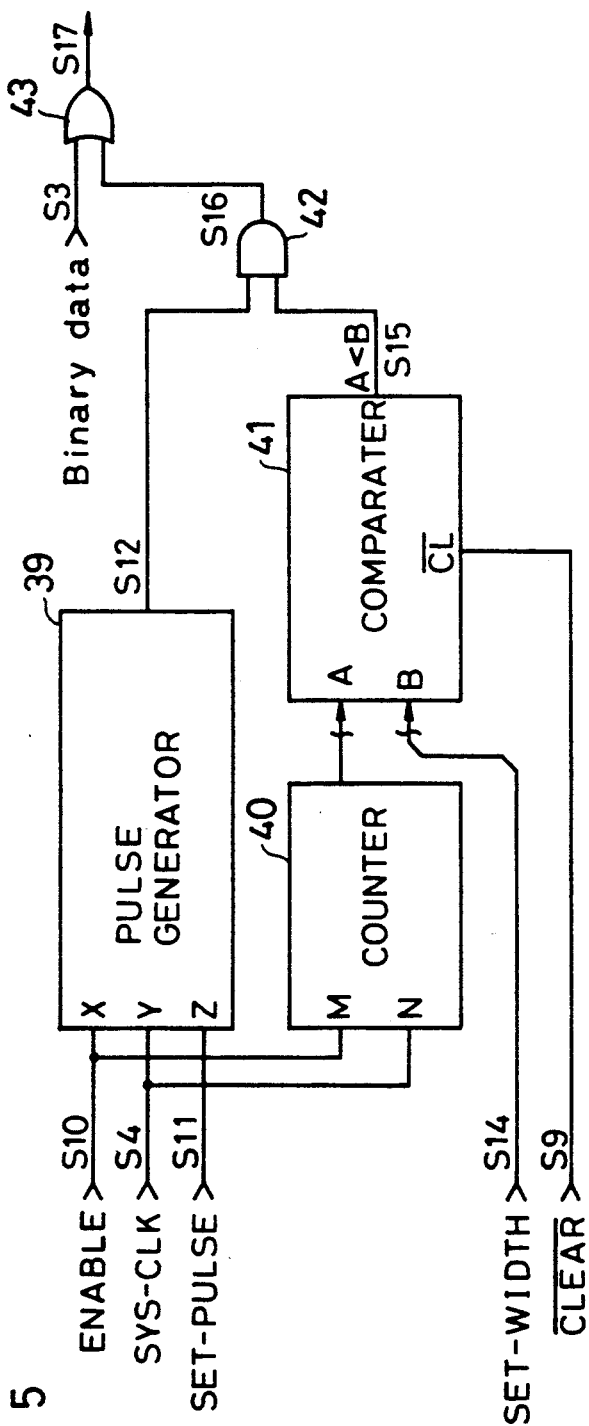
F I G. 5

SHADOW-ADDED IMAGE FORMATION DEVICE

BACKGROUND OF THE INVENTION

1. Field of the Invention

The present invention relates to an image formation device employed in, for example, a copying machine or a facsimile device, for ornamenting an original image by adding another image to the original image.

2. Description of the Prior Art

Conventionally, of image formation devices are known, which form an image from an original image, a part of which is overlaid with a halftone pattern.

However, ornamentation to an image is such an image formation devices should desirably have some variations.

SUMMARY OF THE INVENTION

The present invention provides a shadow-added image formation device comprising a photoelectric converting mechanism scanning an original image in horizontal and vertical directions for converting every pixel into an electric signal, a A/D-converting mechanism for A/D-converting the electric signal of the photoelectric mechanism into a digital sound, a signal converting means for converting the digital signal of the A/D-converting mechanism into a binary serial signal representing white and black pixels, and a detecting mechanism for detecting the width of an area to which shadow can be added from the binary serial signal of the signal converting means, the output changing from a black pixel signal to a white pixel signal and thereafter changing from the white pixel signal into the black pixel signal. A shadow signal formation mechanism for generating a shadow signal which is a combination of a predetermined number of serial white pixel signals with a predetermined number of serial black pixel signals, and a setting mechanism for setting the width of shadow area which is added after the signal outputted by the signal converting mechanism changes from the black pixel signal to the white pixel signal are also provided. Further, a adding mechanism for comparing the width of the areas detected by the detecting mechanism and set by the setting mechanism and adding the shadow signal, corresponding to the narrower area determined by the comparison, to the binary serial signal, and a reproducing mechanism for reproducing an image from the binary serial signal to which the shadow signal has been added are provided.

The above-mentioned photoelectric converting mechanism may be a CCD type image sensor, or MOS type image sensor, or the like. The above-mentioned reproducing mechanism may be a laser printer, a thermal type printer, an ink-ribbon type printer, or the like.

When the shadow signal formation mechanism outputs a shadow signal which is an alternate combination of the same number of serial white and black pixel signals and the adding mechanism adds the shadow signal to the binary serial signal every horizontal scanning line, a stripe shadow is added to an image.

When the shadow signal formation mechanism outputs a shadow signal which is an alternate combination of a single white pixel signal and a single black pixel signal and the adding mechanism adds the shadow signal to the binary serial signal every other horizontal scanning line, a shadow of low dot density is added to an image.

BRIEF DESCRIPTION OF THE DRAWINGS

FIGS. 4 and 5 are circuit diagrams showing main parts of FIG. 3 in detail;

DESCRIPTION OF THE PREFERRED EMBODIMENTS

Figure 1:
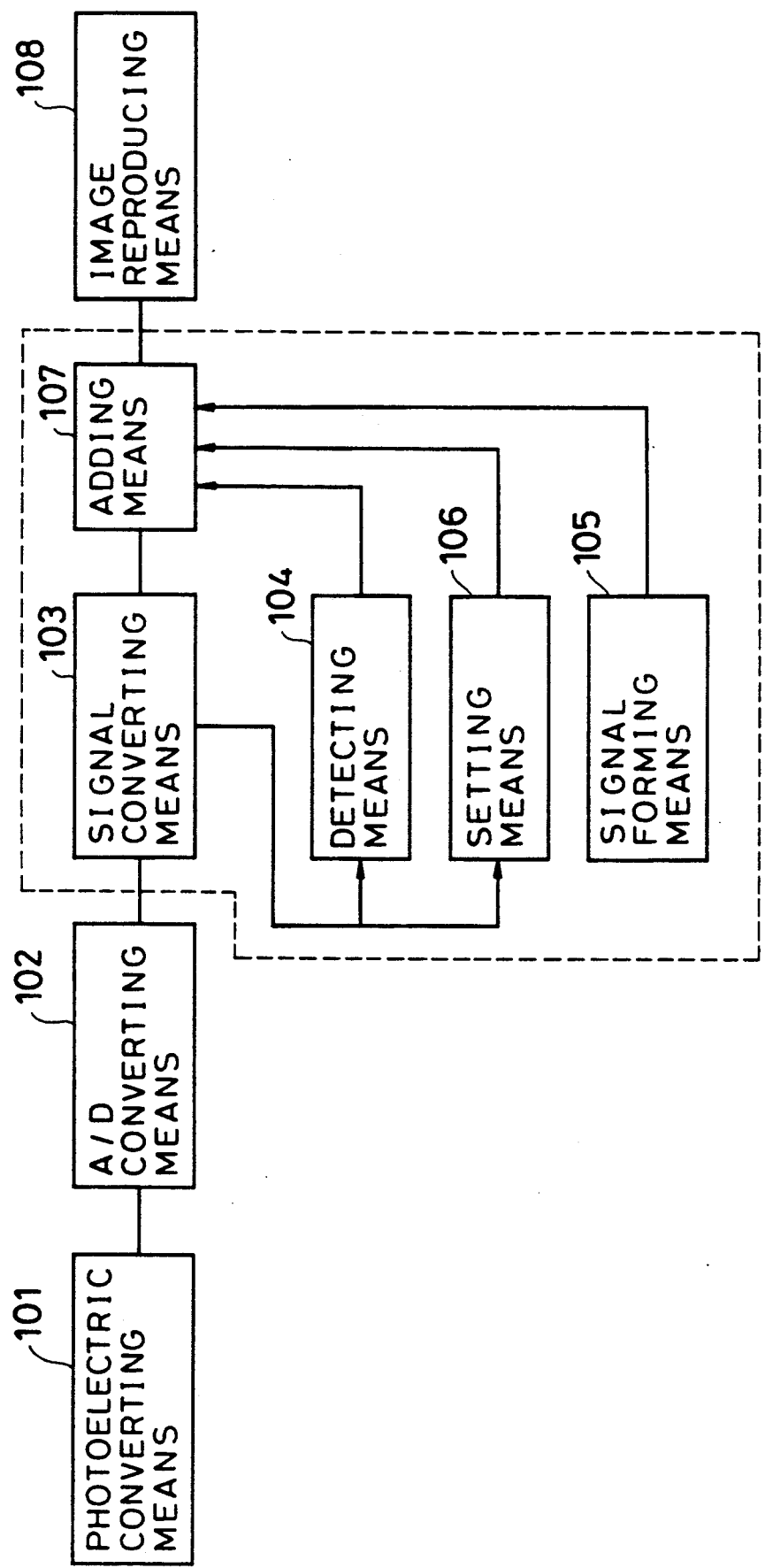
FIG. 1 is a block diagram showing a basic structure of the present invention.

FIG. 1 is a block diagram showing a basic structure of the present invention. Photoelectric converting means 101 horizontally and vertically scans an original image for converting every pixel into an electric signal. A/D-converting means 102 A/D-converts the electrical signal of the photoelectric converting means 101 into a digital signal. Signal converting means 103 converts the digital signal of the A/D-converting means 102 into a binary serial signal representing white and black pixels. Detecting means 104 detects the width of an area to which shadow can be added from the binary serial signal of the signal converting means, the binary serial signal changing from a black pixel signal to a white pixel signal and thereafter changing from the white pixel signal into the black pixel signal. Shadow signal formation means 105 generates a shadow signal which is an alternate combination of a predetermined number of serial white pixel signals with a predetermined number of serial black pixel signals. Setting means 106 sets the width of a shadow area which is added after the signal outputted by the signal converting means 103 changes from the black pixel signal to the white pixel signal. Adding means 107 adds the shadow signal to smaller one of the area detected by the detecting means 104 and the shadow area set by the setting means 106", corresponding to the signal outputted by the signal converting means 103. Reproducing means 108 reproduces an image from the binary serial signal to which the shadow signal has been added.

In this way, the original image is converted into white and black binary image signals, and is reproduced after a shadow image signal is added following the black image signal. Thus, a real-time process of adding shadow to an image can be performed.

Figure 2:
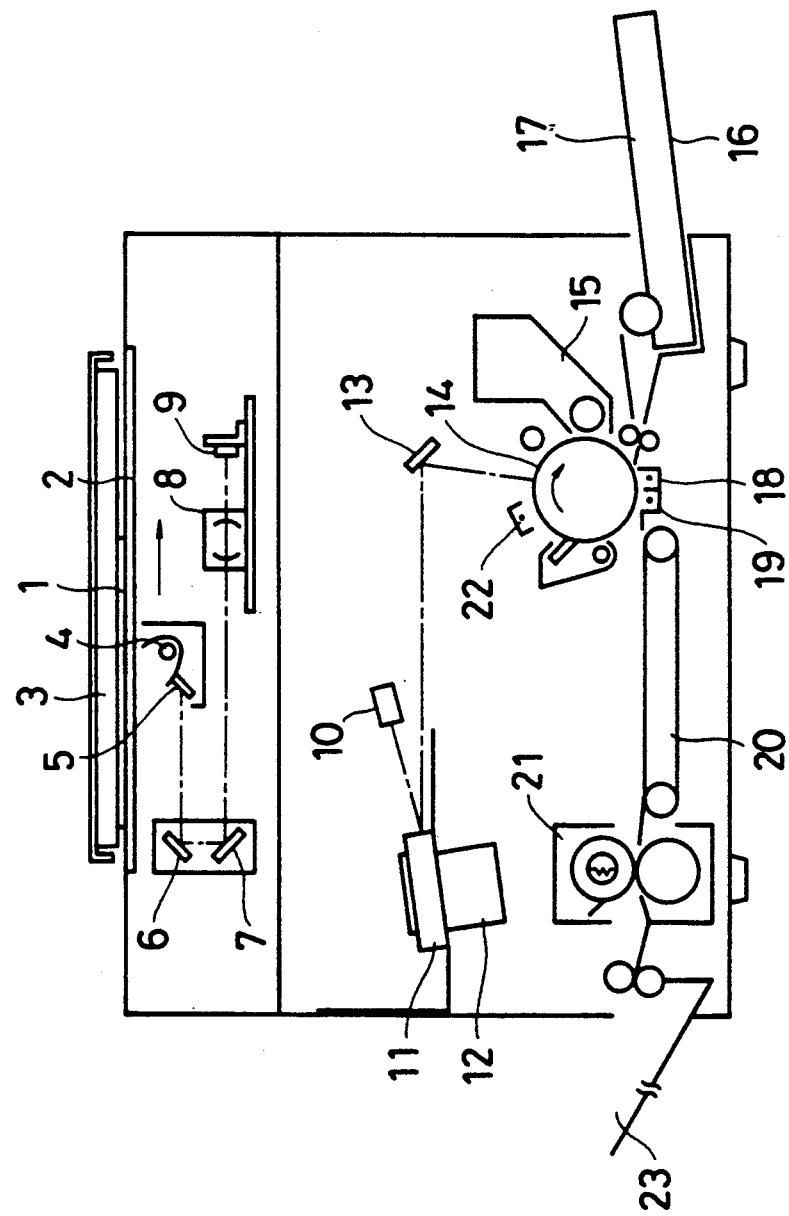
FIG. 2 is a diagram for explaining an embodiment according to the present invention.

FIG. 2 is a diagram for explaining a structure of an embodiment in which the present invention is applied to a copying machine, including an original 1, an original board for holding the original 1, an original cover 3, a lamp 4 moving in a direction corresponding to an arrow for illuminating the original 1, and mirrors 5, 6, 7 for reflecting image light from the original 1. The mirror 5 moves along with the lamp 4 in the direction corresponding to the arrow, while the mirrors 6, 7 also move in the direction corresponding to the arrow at a speed which is ½ of that of the lamp 4. The image light of the original reflected by the mirror 7 is received by CCD type image sensor 9 (referred to as CCD hereinafter) through an f.θ lens 8. The CCD 9 comprises 1000 to 5000 photosensors positioned to make a chip, and make the sensors photoelectrically convert light into electric charge to accumulate it in a built-in capacitor. The electric charge of all the photosensors is transferred to a built-in shift register by a trigger signal and outputted in order. Then an image of the original 1 received by the CCD 9 is converted into video signals by a signal processing circuit mentioned below. A semiconductor laser 10 turns laser light on/off corresponding to the video signals, a polygon mirror 11 reflects laser light emitted by the semiconductor laser 11, a motor 12 drives the polygon mirror 11, and a mirror 13 leads the laser light from the polygon mirror 11 to a photoconductor drum 14 which rotates in a direction corresponding to an arrow. Since the photoconductor drum 14 has been uniformly charged by a main charger 22 in advance, an electrostatic latent image is formed due to the laser light directed thereon, and a toner image is formed by a developing device 15. When copying paper 17 is supplied from a copying paper cassette 16, the toner image is transferred to the copying paper by a transfer charger 18. The copying paper with the toner image transferred is separated from the photoconductor drum 14 by a separating charger 19, carried to a fusing device 21 for fusing toner by a carrying belt 20 and sent to a tray 23. Laser light emitted by the semiconductor laser 10 is horizontally scanned by the polygon mirror while vertically scanned by the rotation of the photoconductor drum 14 in the direction corresponding to the arrow, so as to form an electrostatic latent image corresponding to the image of the original 1 on the photoconductor drum 14.

Figure 3:
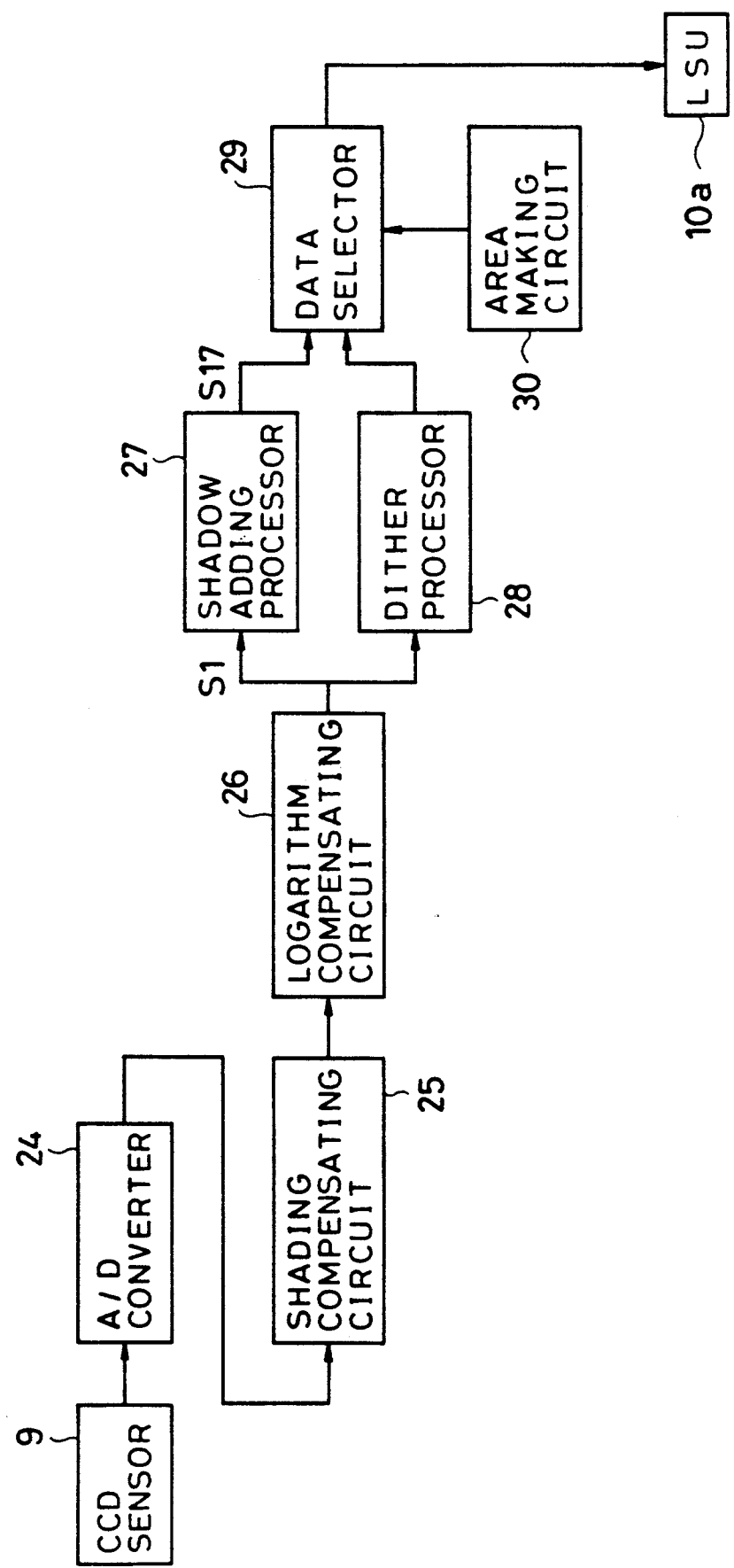
FIG. 3 is a block diagram showing a control circuit of the embodiment shown in FIG. 2.

FIG. 3 is a block diagram showing an image processing circuit of an embodiment shown in FIG. 2. An image signal detected by the CCD 9 is converted into 8-bit digital signal by an A/D-converter 24. Nonstandard of a light quantity distribution of the lamp 4 for illuminating the original and nonstandard of a sensitivity of the photosensors of the CCD 9 are compensated by a shading compensating circuit 25 and a logarithm compensating circuit 26. Furthermore, the image signal is inputted to a shadow-adding processing circuit 27 and a dither processing circuit 28. In the shadow-adding processing circuit 27, shadow is added to image data, and in the dither processing circuit 28, the image data is binarized by a threshold value varying for every pixel, or a dither matrix. Then, a data selector 29 transfers an output of the shadow-adding processing circuit 27 to the semiconductor laser 10 of an image reproducing circuit 10a in an area designated by an area making circuit 30, while transfers an output of the dither processing circuit to the semiconductor laser 10 of the image reproducing circuit 10a in the other area. In this way, the image of the original 1 is copied onto the copying paper 17 after shadow is added to the required part.

The shadow-adding processing circuit 27 will be explained in detail in conjuction with the following two embodiments.

SHADOW-ADDING PROCESSING CIRCUIT (1)

FIGS. 4 and 5 are circuit diagrams for explaining a shadow-adding processing circuit in detail. First, in FIG. 4, a comparator 31 compares digital image signals S1 and binarized threshold signals S2 set in advance, and outputs binary image signals S3 as "1" to those which are higher than the threshold in the image signals S1 and as "0" to those which are lower than the threshold. The binary image signal S3, a basic clock signal S4 and a horizontal synchronization signal S5 are inputted to a D flip flop 32. Then, the binary image signal S3 is inputted to an exclusive OR gate 33 along with a signal preceding by 1 clock and outputted as a signal S6. The signal S6 is inputted to an AND gate 34 along with a binary image signal preceding by 1 clock and outputted as a signal S7. On the other hand, an output of the D flip flop 32 is inverted by an inverter 36, inputted to a NAND gate 37 along with the signal S6 and outputted as a signal S8. The signal S8 is inputted to an AND gate 38 along with a horizontal synchronization signal S5 and outputted as a signal S9. Then, the signals S7 and S9 are inputted to the D flip flop 35 and outputted as a signal S10. In this way, the digital image signal S1 is converted to the binary serial signal S3 representing white and black pixels, and an area to which shadow can be added from a change of the signal S3 from a black pixel signal to a white pixel signal until another change from the white pixel signal to the black pixel signal is outputted as the signals S9 and S10.

In FIG. 5, a pulse generator 39 has input terminals X, Y and Z. The pulse generator 39, receiving a clock signal from the terminal Y while a signal inputted to the terminal X is HIGH, outputs a pulse having HIGH and LOW durations which is the same as a duration of a clock signal multiplied by an integer, corresponding to a set signal inputted from the terminal Z. A counter 40 counts pulses of a clock inputted from a terminal N while a signal inputted to a terminal M is HIGH and outputs the clock. A comparator 41 compares a signal inputted to a terminal A with a signal inputted to a terminal B, and its output turns HIGH when the signal inputted to the terminal A is smaller than the signal inputted to the terminal B, while the comparator 41 is cleared and its output turns LOW when a signal inputted to a terminal C turns from HIGH to LOW. When the pulse generator 39 receives the signals S10 and S4 at its terminals X and Y and a pulse setting signal S11 at its terminal Z, it outputs a clock signal S12 corresponding to the pulse setting signal S11. Furthermore, when the counter 40 receives the signals S10 and S4 at its terminals M and N, its output is inputted to the terminal A of the comparator 41 and compared with a shadow area setting signal S14 set in advance. The comparator 41 outputs a signal S15 as HIGH while an output of the counter 40 is smaller than the signal S14, and is cleared when the signal S9 turns from HIGH to LOW. The signals S12 and S15 are inputted to an AND gate 42, and then outputted as a stripe-shadow signal S16. The shadow signal S16 is inputted to an OR gate 43 along with the binary image signal S3, and then outputted as a stripe-shadow image signal S17.

In FIG. 5, the pulse generator 39 is a circuit for outputting a stripe shadow signal which is an alternate combination of a predetermined number of serial white pixel signals with a predetermined number of serial black pixel signals; in other words, it is a circuit for arbitrarily setting a width and pitch of stripes. To form clear stripes of the shadow, the width and pitch of the stripes are preferably 2 dot or more. The counter 40 and the comparator 41 are adding circuits for adding a shadow signal to the smaller one of the area to which shadow can be added and the shadow area set in advance. In other words, the comparator 41 is a circuit for setting the width of the shadow to be added.

Figure 6:
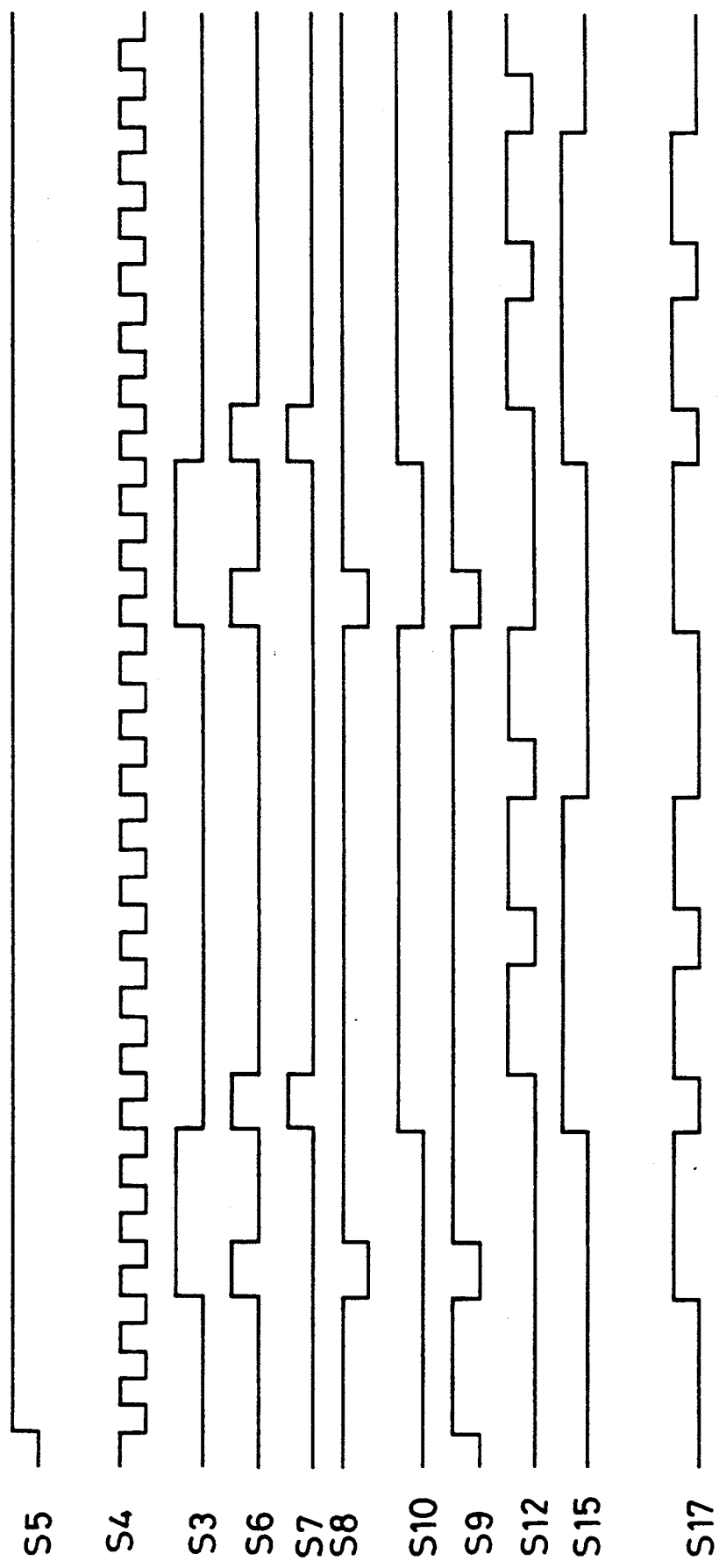
FIG. 6 is a timing chart showing the operation of the electric circuits shown in FIGS. 4 and 5.
Figure 7:
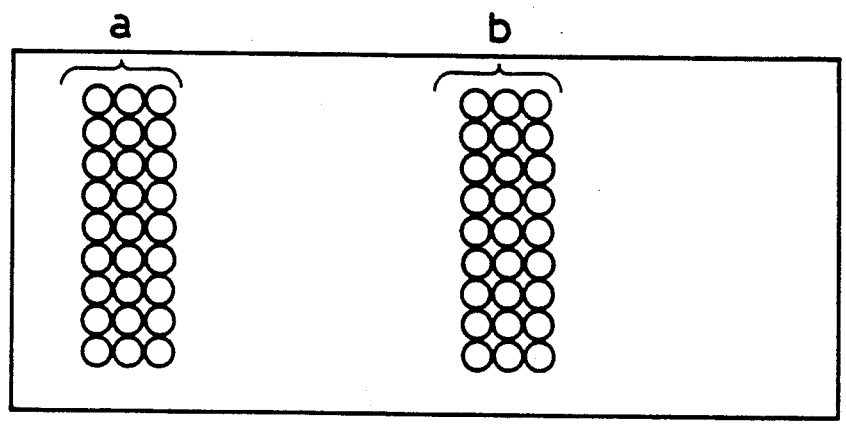
FIGS. 7(A) and 7(B) and FIGS. 8(A) to 8(C) are diagrams showing some models of the relations between an original image and an image to which shadow is added.
Figure 7:
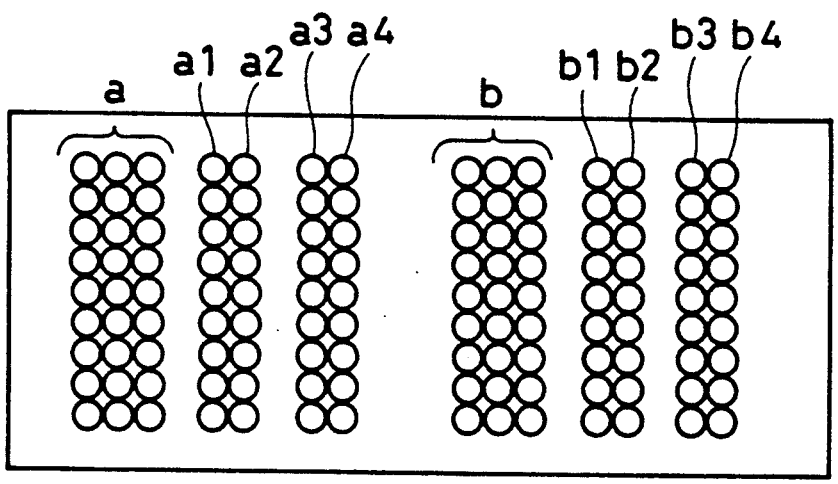

FIG. 6 shows a timing chart of each signal mentioned above. Repetitiously outputting a waveform of an image signal S17 shown in FIG. 6, an image with stripe shadow shown in FIGS. 7(A) and 7(B) is formed (◯ represents a black pixel). FIG. 7(A) denotes an original and FIG. 7(B) denotes an image to which shadow has been added. A stripe shadow image in which black pixels a1 and a4 and b1 to b4 are distributed at predetermined intervals in every horizontal scan line is added to images a and b of the original.

Figure 8:
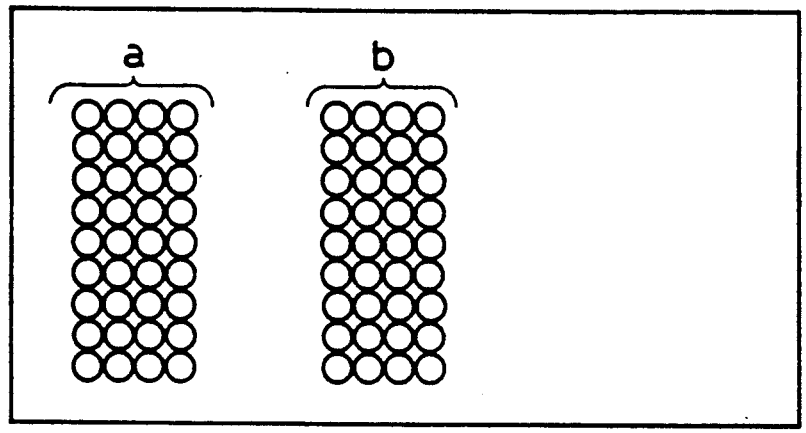
Figure 8:
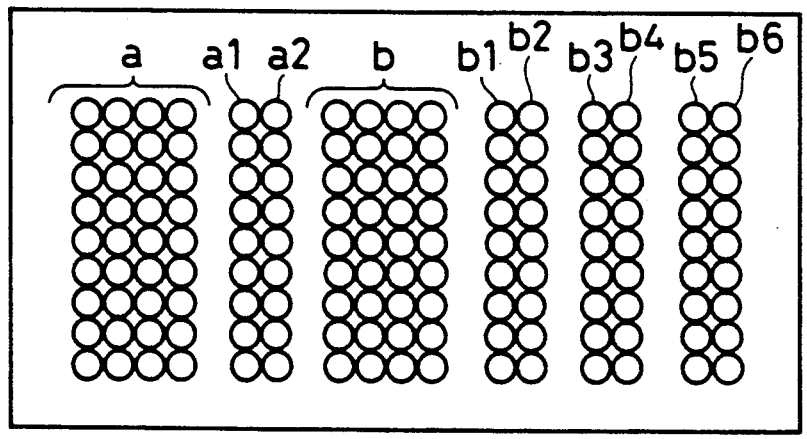
Figure 8:
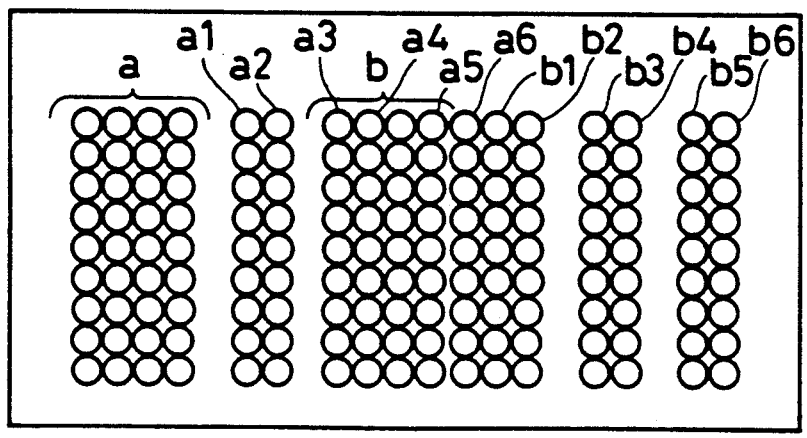

FIGS. 8(a) to 8(c) are diagrams showing another example of the process of adding stripe shadow (◯ represents a black pixle). Shadow wider than an interval between the image "a" and the image "b" is added to an original (A) with black pixels forming three stripes of width 2 dot. The above-mentioned detecting means for detecting the area to which shadow can be added works to add shadow to the image "a" with two black pixels a1 and a2 alone and to the image "b" with black pixels b1 to b6, respectively. Thus, the image "b" and the image "a" never overlap each other, and a shadow-added image having a successful ornamentation effect can be obtained. On the contrary, FIG. 8(C) shows an example in which shadow is added without detecting an area to which shadow can be added. The shadow of the image "a", or black pixels a3 to a6, and the image "b" overlap each other to make the boundary between the original image and the shadow blurred. This leads to loss of the ornamentation effect in spite of shadow adding process.

Figure 9:
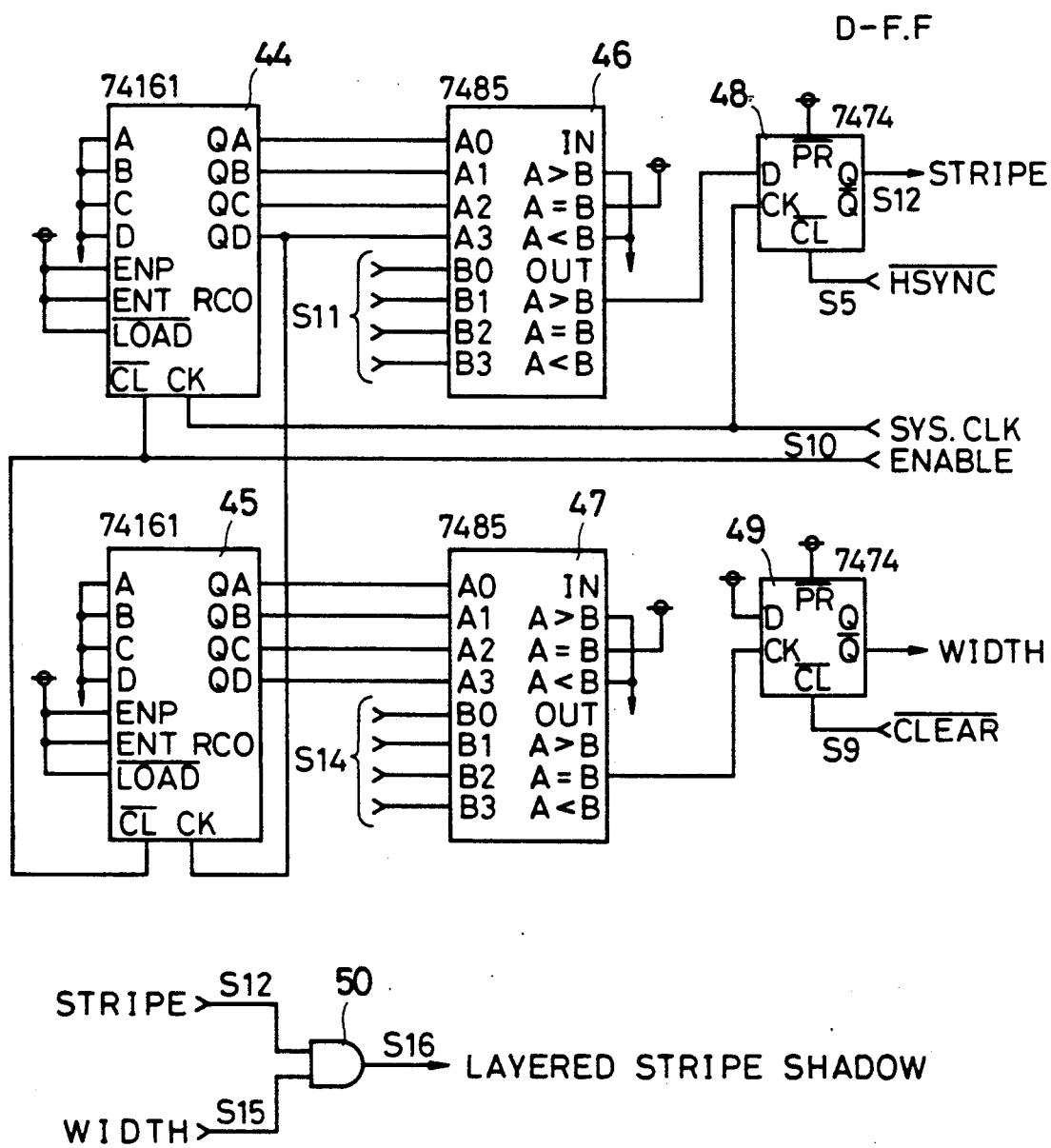
FIG. 9 is a circuit diagram showing an example using ICs in the electric circuit shown in FIG. 5.

FIG. 9 is a circuit diagram showing an example in the case where the circuit in FIG. 5 is more specifically structured with ICs; for example, counter ICs 44, 45 (e.g., 74161), comparator ICs 46, 47 (e.g., 7485), D flip flop ICs 48 to 49 and an AND gate 50. The circuits including the counter IC 44, the comparator IC 46 and the D flip flop 48 corresponds to the pulse generator 39 shown in FIG. 5. The circuit including the counter IC 45, the comparator IC 47 and the D flip flop 49 corresponds to the counter 40 and comparator 41 shown in FIG. 5.

Figure 10:
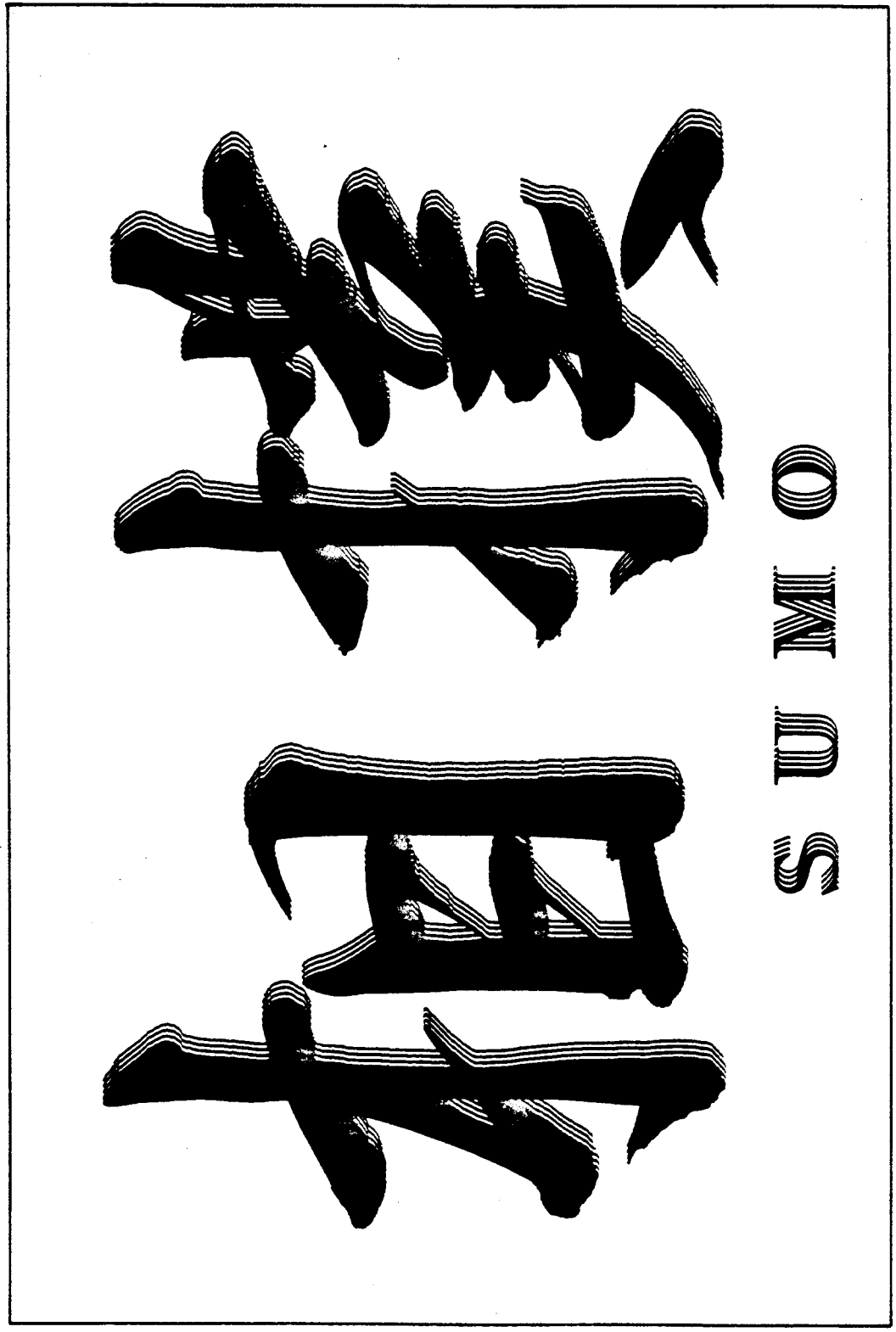
FIG. 10 is a diagram showing an example of an image with stripe shadow formed by the embodiment shown in FIG. 2.

FIG. 10 is an example of a shadow-added image obtained according to this embodiment.

According to the present invention, in reproducing an original, a real-time addition of stripe shadow to an original image can be performed.

SHADOW-ADDING PROCESSING CIRCUIT (2)

Figure 11:
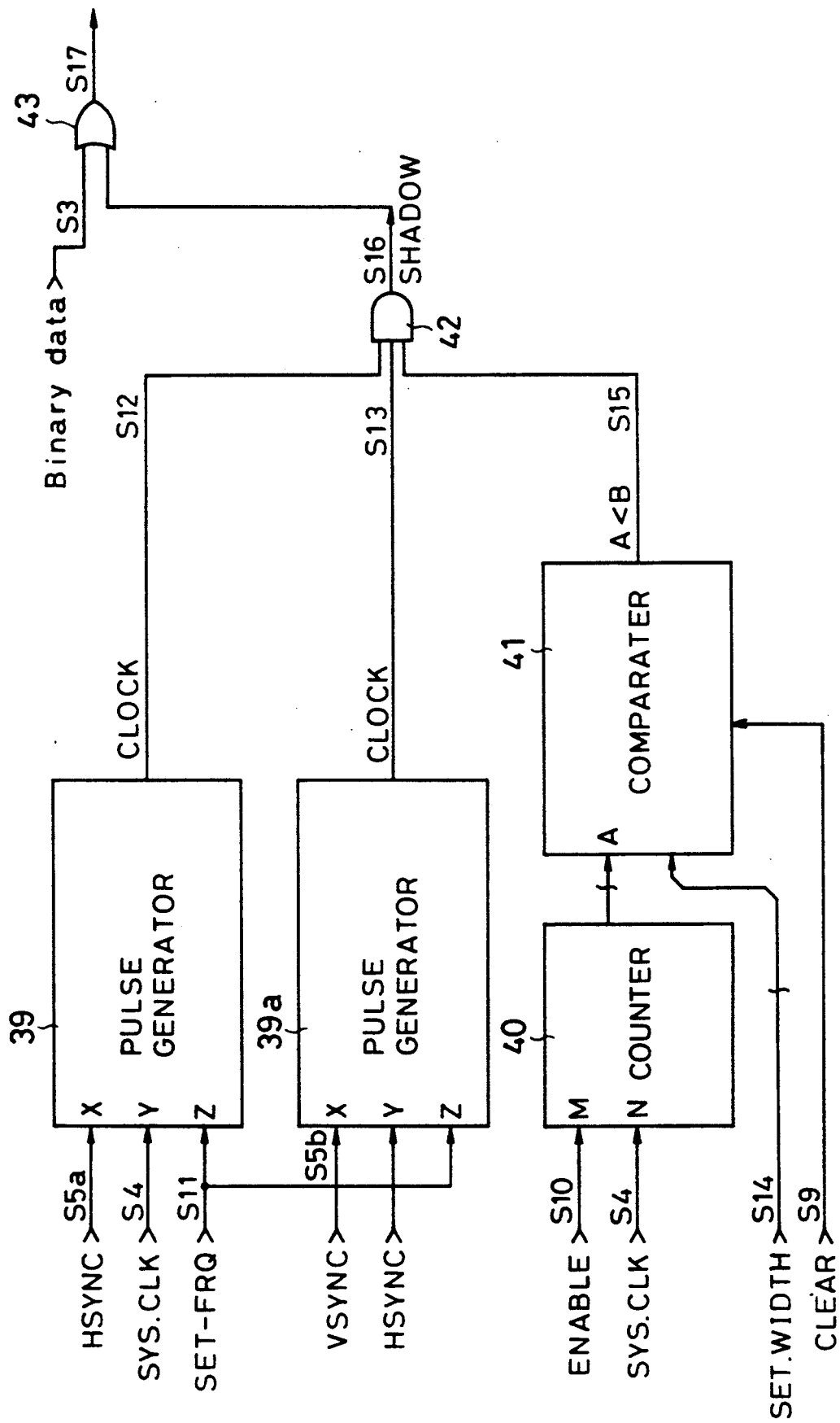
FIG. 11 is a circuit diagram showing another example of the main portion of FIG. 3.

Another processing circuit is composed of electric circuits diagram shown in FIGS. 4 and 11. In the circuit in FIG. 4, a digital image signal S1 and a binarized threshold signal S2 set in advance are inputted thereto, and processed similar to the above embodiment: the digital image signal S1 is converted into a binary serial signal S3 representing white and black pixels, while the area to which shadow can be added from a change of the signal S3 from a black pixel signal to a white pixle signal till another change from the white pixel signal to the black pixel signal is outputted as signals S9 and S10.

Then, in FIG. 11, each of pulse generators 39, 39a has input terminals X, Y and Z, and when it receives a clock signal from the terminal Y while a signal inputted to the terminal X is HIGH, it divides and outputs the clock signal corresponding to a set signal received from the terminal Z. A counter 40 counts pulses of a clock inputted from a terminal N while a signal inputted to a terminal M is HIGH, and outputs the clock. A comparator 41 compares a signal inputted to a terminal A with a signal inputted to a terminal B, and its outputs turns HIGH when the signal inputted to the terminal A is smaller than the signal inputted to the terminal B. The comparator 41 is cleared with a signal inputted to a terminal C turns from HIGH to LOW, and its output turns LOW. When the pulse generator 39 receives a horizontal synchronization signal S5a and a clock signal S4 from its X and Y terminals and receives a set signal S11 for ½-dividing a frequency from its terminal Z, it outputs a clock signal S12 which is obtained by ½-dividing a basic cock signal s4. Furthermore, when the pulse generator 39a receives a vertical synchronization signal s5b from its X terminal and receives the horizontal synchronization signal S5a and the set signal S11 from its terminals Y and Z, it outputs a clock signal S13 which is obtained by ½-dividing the horizontal synchronization signal S5a. Furthermore, when the counter 40 receives the signal S10 and the clock signal S4 from its terminals M and N, its output is applied to a terminal a of the comparator 41 and compared with a shadow area setting signal S14 set in advance. The comparator 41 outputs a signal S15 as HIGH while an output of the counter 40 is smaller than the signal S14, and is cleared when the signal S9 turns from HIGH to LOW. The signals S12, S13 and S15 are inputted to an AND gate 42 and outputted as a shadow signal S16. Then, the shadow signal S16 is inputted to an OR gate 43 along with a binary image signal S3 and outputted as a shadow-added image signal S17.

In FIG. 11, the pulse generator 39 is a circuit for outputting a shadow signal which is an alternate combination of a predetermined number of serial white pixel signals with a predetermined number of serial black pixel signals; in other words, it is a circuit for setting a density of black pixels in a shadow in the horizontal scanning direction. The counter 40 is a circuit for setting a shadow area to be added after a change of the binary image signal S3 from the black pixel signal to the white pixel signal. The pulse generators 39, 49a, the counter 40 and the comparator 41 are used as an adding circuit for adding a shadow signal to the smaller one of the area to which shadow can be added and the shadow area set in advance; namely, the pulse generator 39a is a circuit for setting a density of black pixels of the shadow in the vertical scanning direction.

Figure 12:
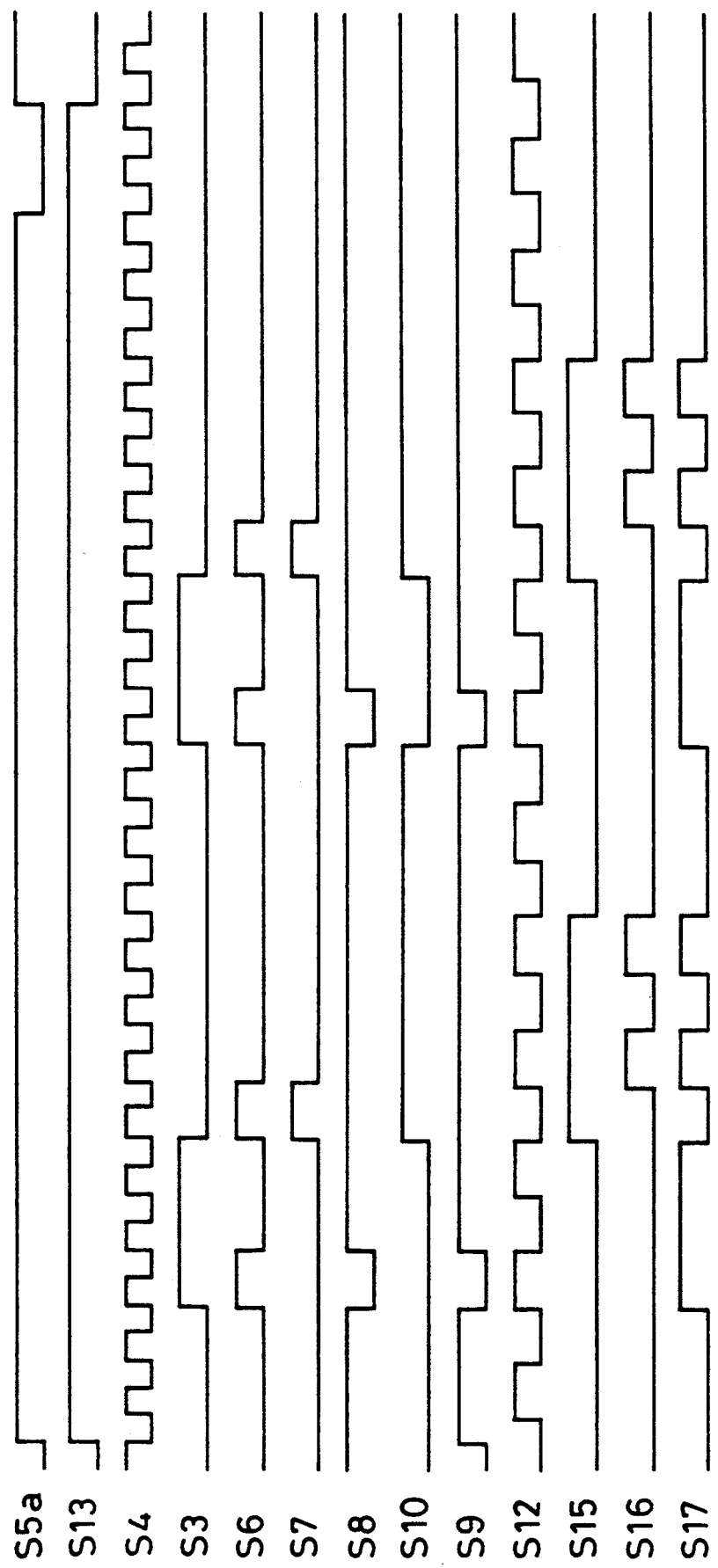
FIGS. 12 and 13 are timing charts showing the operation of the electric circuit diagram showing in FIG. 11.
Figure 13:
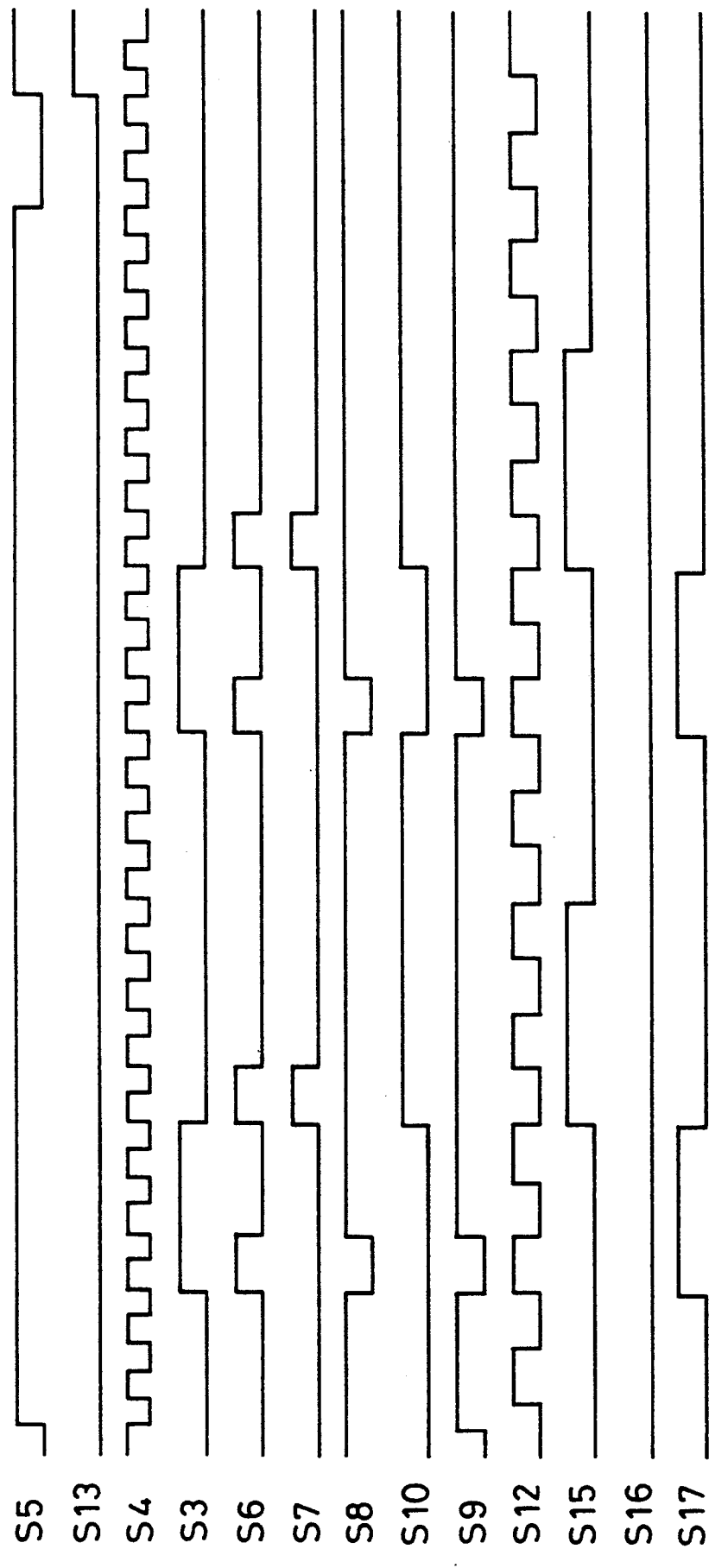
Figure 14:
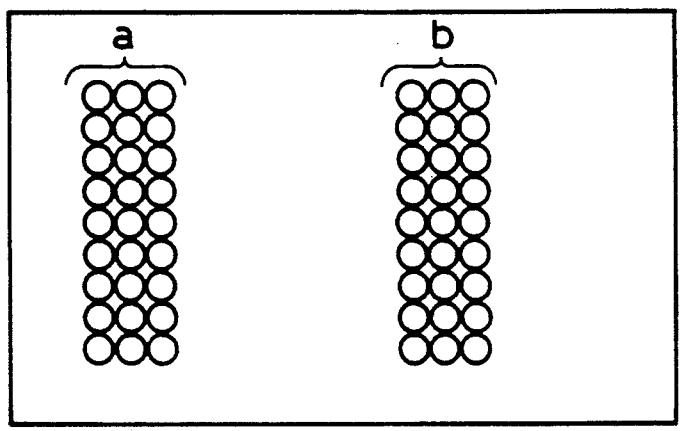
FIGS. 14(A) and 14(B) and FIGS. 15(A) to 15(C) are diagrams showing models of the relations between the original image and the image to which the shadow is added.
Figure 14:
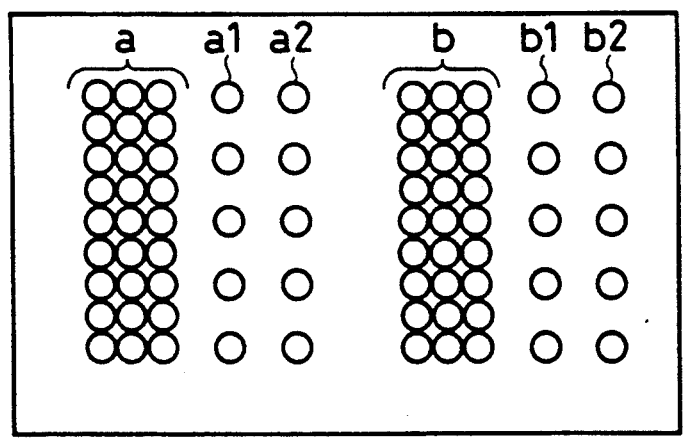

FIGS. 12 and 13 show timing charts of the above-mentioned signals. Since the output S13 of the pulse generator 39a shown in FIG. 11 is divided to have a frequency that is ½ of the frequency of the horizontal synchronization signal S5, FIG. 12 shows a state where the signal S13 is HIGH while FIG. 13 shows a state where it is LOW. The shadow-added image signal S17 repetitiously appears with waveforms as shown in FIGS. 12 and 13, and a shadow-added image as shown in FIG. 14(b) is formed (◯ represents a black pixel);

namely, FIG. 14(A) denotes an original image and FIG. 14(B) denotes a shadow-added images. A shadow image in which black pixels a1, a2, b1 and b2 are distributed at equal intervals in horizontal and vertical scanning directions is added to the images "a" and "b" of the original.

Figure 15:
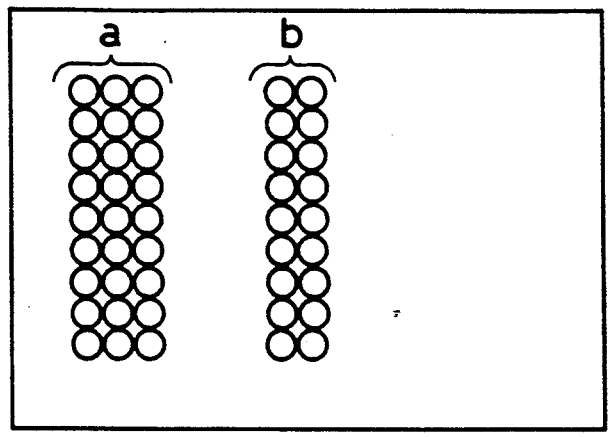
Figure 15:
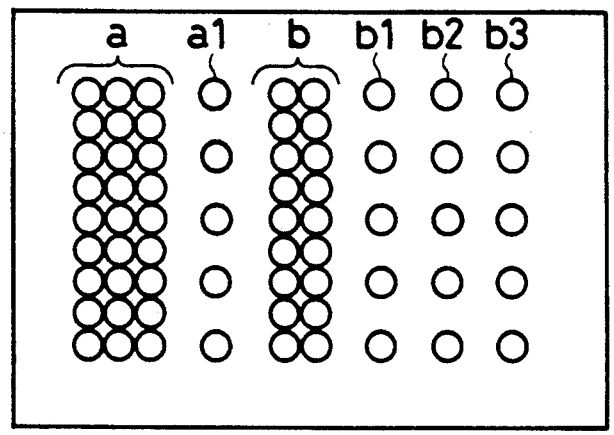
Figure 15:
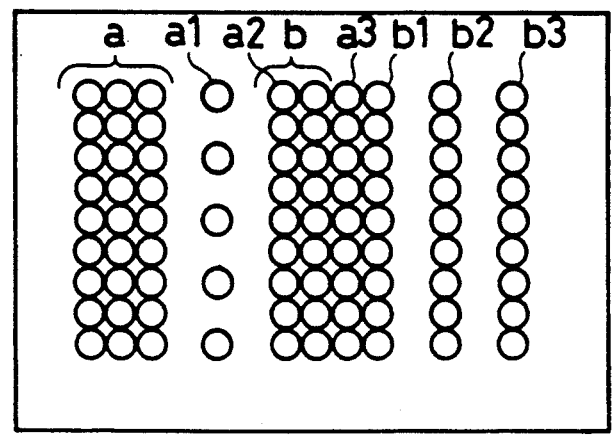

A density of black pixels in the horizontal and vertical scanning directions in a shadow-added part can be arbitrarily set by changing the set signal S11 inputted to the pulse generators 39, 39a and designating ½-or ¼-frequency dividing. Moreover, when the pulse generators 39, 39a receive different set signals from their respective terminals Z, shadows having different densities of black pixels can be added in the horizontal and vertical directions. FIGS. 15(A) to 15(C) are diagrams showing other examples of the shadow-adding process (○ represents a black pixel).

FIG. 15(A) shows an original. In the case where a shadow image in which three black pixels are distributed at equal intervals is added to the images "a" and "b" of the original, when the width of the shadow image is larger than the interval between the image "a" and the image "b", the above-mentioned detecting means for detecting the area to which shadow can be added works to add shadow to the image "a" in the horizontal scanning direction with a single black pixel a1 alone and to the image "b" with the three black pixels b1, b2 and b3. Thus, the image "b" and the shadow of the image "a" never overlap each other, and a shadow-added image having a successful ornamentation effect can be obtained.

On the contrary, FIG. 15(C) shows a case in which shadow is added without detecting the area to which shadow can be added. The shadow of the image "a", or black pixels a2, a3, and the image "b" overlap each other to make the boundary between the original image and the shadow blurred. This leads to loss of the ornamentation effect in spite of shadow adding process.

Figure 16:
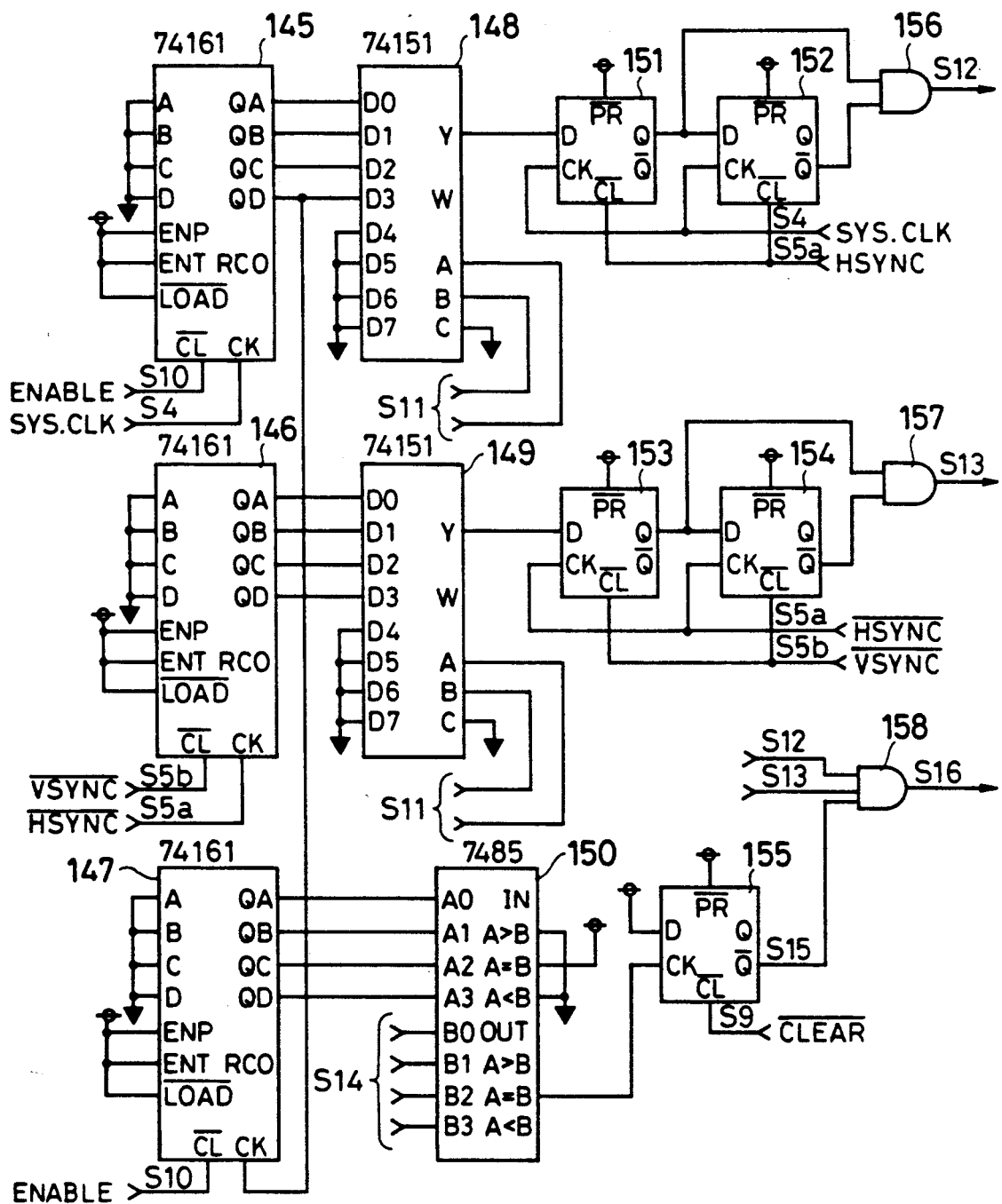
FIG. 16 is a circuit diagram showing an example using ICs in the electric circuit shown in FIG. 11.

FIG. 16 is a circuit diagram showing an example in the case where the circuit in FIG. 11 is more specifically structured with ICs; for example, counter ICs 145 to 147 (e.g., 74161), selector ICs 148, 149 (e.g., 74151), D flip flop ICs 151 to 155 and AND gates 156 to 158. The circuit including the counter IC 145, the selector IC 148, the D flip flop ICs 151, 152 and the AND gate 156 corresponds to the pulse generator 39 shown in FIG. 11. The circuit including the counter IC 146, the selector IC 149, the D flip flop ICs 153, 154 and the AND gate 157 corresponds to the pulse generator 39a shown in FIG. 11. The counter IC 147, the comparator IC 150 and the D flip flop 155 correspond to the counter 40 and comparator 41 shown in FIG. 11.

Figure 17:
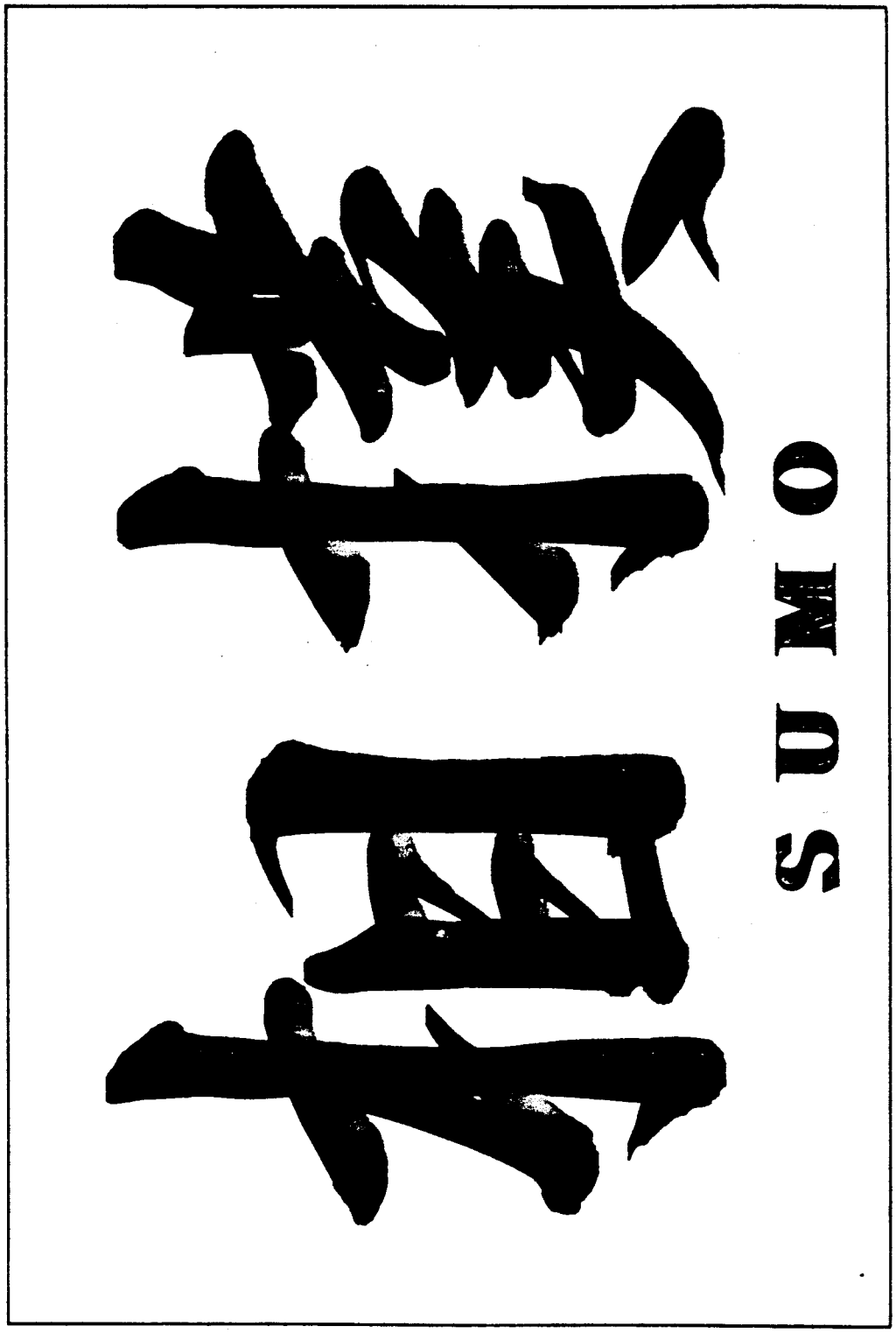
FIG. 17 is a diagram showing another example of an image with shadow formed by the embodiment shown in FIG. 2.

FIG. 17 shows an example of a shadow-added image obtained by a signal process in the circuits shown in FIGS. 4 and 11.

According to the present invention, when an original is reproduced, a real-time addition of a shadow having an arbitrary dot density and an arbitrary width to an original image can be performed.

What is claimed is:

1. A shadow-added image formation device, comprising: photoelectric converting means scanning an original image in horizontal and vertical directions for converting every pixel into an electric signal;

A/D-converting means for A/D-converting said electric signal into a digital signal;

signal converting means for converting said digital signal into a binary serial signal representing white and black pixels;

detecting means for detecting the width of an area to which shadow can be added from the black to white and white to black transitions of the binary serial signal;

shadow signal formation means for generating a shadow signal including a predetermined number of serial black and white pixel signals;

setting means for setting the width of a shadow area;

adding means for comparing the width of the areas detected by the detecting means and set by the setting means and adding the shadow signal, corresponding to the narrower area determined by said comparison, to the binary serial signal; and reproducing means for reproducing an image from the binary serial signal to which the shadow signal has been added.

2. A device according to claim 1, wherein said adding means adds said shadow signal to the binary serial signal for every horizontal scanning line, whereby a vertically-striped shadow is created.

3. A device according to claim 1, wherein said adding means adds said shadow signal to the binary serial signal for every one of a predetermined number of horizontal scanning lines, whereby a low dot density shadow is created.

4. A device according to claim 1, wherein said shadow signal formation means outputs a shadow signal which is an alternate combination of the same number of serial white and black pixel signals and said adding means adds said shadow signal to the binary serial signal every horizontal scanning line, whereby a vertically-shaped shadow is created.

5. A device according to claim 1, wherein said shadow signal formation means outputs a shadow signal which is an alternate combination of a single white pixel signal with a single black pixel signal, and said adding means adds said shadow signal to the binary serial signal every other horizontal scanning line, whereby a low dot density shadow is created.

* * * * *